US008780177B2

(12) United States Patent
Eccles et al.

(10) Patent No.: US 8,780,177 B2
(45) Date of Patent: Jul. 15, 2014

(54) APPARATUS AND METHOD FOR CAMERA PARAMETER CALIBRATION

(75) Inventors: Etienne Eccles, Surrey (GB); Ben White, Surrey (GB); Geoff Thiel, Surrey (GB); Jung Keun Ahn, Goyang-si (KR)

(73) Assignees: UDP Technology Ltd., Seoul (KR); VCA Technology, Surrey (GB)

( * ) Notice: Subject to any disclaimer, the term of this patent is extended or adjusted under 35 U.S.C. 154(b) by 542 days.

(21) Appl. No.: 12/870,213

(22) Filed: Aug. 27, 2010

(65) Prior Publication Data

US 2011/0149041 A1   Jun. 23, 2011

(30) Foreign Application Priority Data

Dec. 17, 2009   (KR) .......................... 10-2009-0126014

(51) Int. Cl.
*H04N 5/225* (2006.01)
*H04N 5/232* (2006.01)

(52) U.S. Cl.
CPC ................................ *H04N 5/23216* (2013.01)
USPC .......................................................... 348/46

(58) Field of Classification Search
CPC .......................... H04N 5/232; H04N 5/23216
See application file for complete search history.

(56) References Cited

U.S. PATENT DOCUMENTS

| 6,094,625 A * | 7/2000 | Ralston .......................... 702/150 |
| 2007/0238981 A1* | 10/2007 | Zhu et al. ...................... 600/424 |
| 2008/0088620 A1* | 4/2008 | Shih et al. ...................... 345/420 |

FOREIGN PATENT DOCUMENTS

| KR | 10-0533328 | 11/2005 |
| KR | 10-0920225 | 9/2009 |

* cited by examiner

*Primary Examiner* — Sath V Perungavoor
*Assistant Examiner* — Kate Luo
(74) *Attorney, Agent, or Firm* — Rabin & Berdo, P.C.

(57) ABSTRACT

The present invention provides an apparatus and method for camera parameter calibration which is capable of easily and simply setting physical and optical characteristic parameters of a camera in order to acquire information on actual measurement of an image provided through the camera with high accuracy. The camera parameter calibration apparatus and method has an advantage of correct image analysis that it is capable of increasing accuracy of information of measurement through an image only with an intuitive interface manipulation, without taking a time-consuming and incorrect actual measurement procedure, by determining parameters of the space model corresponding to the image by displaying a 3D space model corresponding to a real space of the image on the image and changing and adjusting visual point parameters such that the 3D space model matches the display image, and regarding the determined parameters of the space model as camera parameters of the image.

8 Claims, 9 Drawing Sheets

APPARATUS AND METHOD FOR CAMERA PARAMETER CALIBRATION

CROSS-REFERENCE TO RELATED APPLICATION

This application claims the benefit of Korean Application No. 10-2009-0126014, filed on Dec. 17, 2009, with the Korean Intellectual Property Office, the disclosure of which is incorporated herein by reference.

BACKGROUND OF THE INVENTION

1. Field of the Invention

The present invention relates to an apparatus and method for camera parameter calibration, and more particularly, to an apparatus and method for camera parameter calibration which is capable of easily and simply setting physical and optical characteristic parameters of a camera in order to acquire information on the actual size of objects within an image provided through the camera with high accuracy.

2. Description of the Related Art

With recent rapid development of imaging technologies for security, vision recognition and so on, there have been developed various image processing techniques for analyzing contents of an image obtained through a camera, recognizing objects in the image, and identifying motion of the objects to determine situations occurring in the image, thereby making advanced auto-situation recognition possible.

For example, such image processing techniques provide a function of identifying detected objects from their speed, size and shape to grasp abnormal behaviors or situations of the detected objects, as well as a function of relatively simple image recognition such as recognizing pedestrians in an image or detecting a trespasser entering a particular site.

FIG. 1 shows an example of image processing which is being currently used, where a pedestrian 11 appearing on an image 10 is detected, a mark 12 for detection identification is displayed, and size and moving speed 13 of the pedestrian 11 are detected.

Such image processing requires an object detection function, an object identifying technique, a moving object tracking technique, and a technique for correctly matching objects within an image to information of size in a real space for correct identification and determination of size, speed and the like.

In particular, a space mapping which allows correct measurement of size is essential for precise image analysis, however, for a camera image obtained by projecting a portion of 3-dimensional (3D) space onto a 2-dimensional (2D) space, it is difficult to map a 2D image to a 3D space model without additional information. However, if several parameters used in obtaining the image can be known, it is possible to map the 2D image to the 3D real space by mathematically modeling the 3D real space. Examples of such parameters may mainly include installation height, tilt angle and field of view (FOV) of a camera which captures the image. Correct knowledge of these parameters makes space model configuration by a mathematical modeling possible.

However, for such a space model configuration, since the installation position and tilt angle of the camera must be actually measured, it is not easy to calculate the height and tilt angle of the camera and reliability of calculated actual measurement values is not high due to irregularity of ground and so on. In addition, for FOV, if an auto-focusing function or a zooming function is used for the FOV, it is difficult to obtain correct values of the FOV.

FIG. 2 shows an example of a camera configuration for explaining FOV. As shown, a camera 20 generally includes a lens 21 and an imaging device 22. A distance from the center of the lens 21 to the imaging device 22 is referred to as a focal length (FL) and an optical angle of a region in which an image is formed on the imaging device 22 is referred to as FOV. The FOV may be obtained using the characteristics of the lens 21 and the size and focal length of the imaging device 22. However, all relevant information may not be provided of such camera characteristics and the focal length may be varied if an auto-focusing function is employed, thereby disallowing a user to know such information, of the focal length and so on, which results in difficulty in achieving a correct camera modeling.

After all, since it is difficult for the user to know all of the height, tilt angle and FOV of the camera, a method is being used which actually exposes an object of known size and matches the object within the image to the real object size. However, this method is very inconvenient since the method must be again performed if a monitoring site is changed or a tilt angle is varied.

There is therefore a need for a novel calibration apparatus and method which is capable of more simply and conveniently generating a calibration for mapping an image to a real space model.

SUMMARY OF THE INVENTION

Accordingly, it is an objective of the present invention to provide a novel camera parameter calibration apparatus and method for calibration for an effective mapping of an image to a corresponding space model, which is capable of increasing accuracy of information of measurement through an image only with an intuitive interface manipulation, without taking a time-consuming and incorrect actual measurement procedure, by determining parameters of the space model corresponding to the image by displaying a 3D space model corresponding to a real space of the image on the image and changing and adjusting visual point parameters such that the 3D space model matches the display image, and regarding the determined parameters of the space model as camera parameters of the image.

It is another objective of the present invention to provide a novel camera parameter calibration apparatus and method which is capable of setting parameters for mapping an image to a real space by adjusting a 3D model object to correspond to a similar object in a real image by displaying the 3D model object on the image, allowing the 3D model object to be moved around on the ground and varying the representation of the 3D model object through adjustment of height, tilt angle and FOV of a camera.

It is still another objective of the present invention to provide a novel camera parameter calibration apparatus and method which is capable of re-adjusting an accuracy by displaying a 3D model object of known size on an image, mapping the image to a virtual space representing the 3D model object by associating an object of the image with the 3D model object, and measuring the length of any object on a display screen through a virtual ruler.

It is yet still another object of the present invention to provide a novel camera parameter calibration apparatus and method which is capable of using correct calibration information corresponding to camera conditions and estimating the calibration information according to the change of the camera conditions by acquiring the calibration information on the image in plural locations of a camera through model objects on a 3D space and storing the calibration information in association with current camera conditions.

To achieve the above objectives, according to an aspect of the invention, there is provided a camera parameter calibration apparatus including: a 3D space manager which generates a 3D object of preset size represented on a 3D space according to a parameter related to a visual point and changes the parameter according to an external control; an image combiner which combines the 3D object generated by the 3D space manager with an image provided from an external image source and displays the combined 3D object and image at once; and a setting manager which stores the parameters set by the 3D space manager in association with the external image source.

The 3D space manager may display a base surface of the 3D space as a 2D grid and may display a plurality of 3D objects and move and display a 3D object selected in the 3D space according to the external control.

The parameters related to the visual point of the 3D space may include at least one of height, tilt angle, field of view, lens characteristics, focal length and resolution, which are associated with camera parameters for the external image source.

According to another aspect of the invention, there is provided a camera parameter calibration method including: a model generating step of generating a space model representing one or more 3D objects on a 3D space; a parameter adjusting step of overlaying and displaying the 3D objects generated in the model generating step on an image provided from an external image source and adjusting visual point parameters of the space model according to an external control signal; and a setting step of storing the parameters adjusted in the parameter adjusting step as camera parameters for the external image source.

The parameter adjusting step may further include a step of reconfiguring the space model to change at least one of the visual point parameters including at least one of height, tilt angle, field of view, lens characteristics and focal length for a visual point of the space model according to the external control signal, and overlaying and displaying the reconfigured space model on the image.

The camera parameter calibration apparatus and method according to an embodiment of the present invention has an advantage of correct image analysis that it is capable of increasing accuracy of information of measurement through an image only with an intuitive interface manipulation, without taking a time-consuming and incorrect actual measurement procedure, by determining parameters of the space model corresponding to the image by displaying a 3D space model corresponding to a real space of the image on the image and changing and adjusting visual point parameters such that the 3D space model matches the display image, and regarding the determined parameters of the space model as camera parameters of the image.

The camera parameter calibration apparatus and method according to an embodiment of the present invention has an advantage that it is capable of simply and offhandedly setting parameters for mapping an image to a real space by adjusting a 3D model object to correspond to a similar object in an real image by displaying the 3D model object on the image, allowing the 3D model object to be moved around on the ground and varying the representation of the 3D model object through adjustment of height, tilt angle and FOV of a camera.

The camera parameter calibration apparatus and method according to an embodiment of the present invention has an advantage of enhanced calibration accuracy because it is capable of re-adjusting an accuracy by displaying a 3D model object of known size on an image, mapping the image to a virtual space representing the 3D model object by associating an object of the image with the 3D model object, and measuring the length of any object on a display screen through a virtual ruler.

The camera parameter calibration apparatus and method according to an embodiment of the present invention has an advantage of enhanced accuracy of image analysis and increased degree of freedom for image selection because it is capable of using correct calibration information corresponding to camera conditions and estimating the calibration information according to change of the camera conditions by acquiring the calibration information on the image in plural locations of a camera through model objects on a 3D space and storing the calibration information in association with current camera conditions.

BRIEF DESCRIPTION OF THE DRAWINGS

The above and/or other aspects and advantages of the present invention will become apparent and more readily appreciated from the following description of the embodiments, taken in conjunction with the accompanying drawings of which.

DETAILED DESCRIPTION OF THE PREFERRED EMBODIMENT

Hereinafter, the present invention will be described in detail by way of preferred embodiments with reference to the accompanying drawings.

Figure 1:
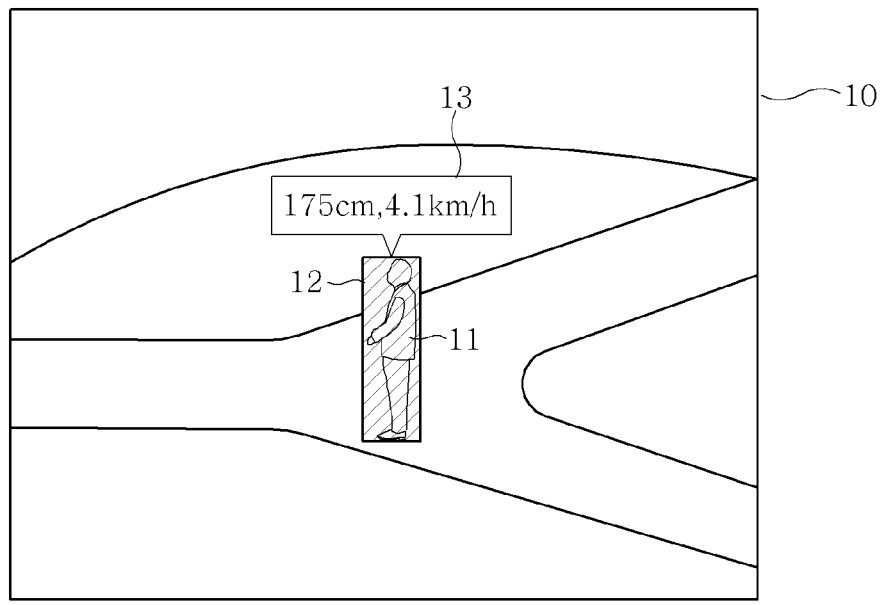
FIG. 1 is a view showing an example of analysis of a general image analysis system.
Figure 2:
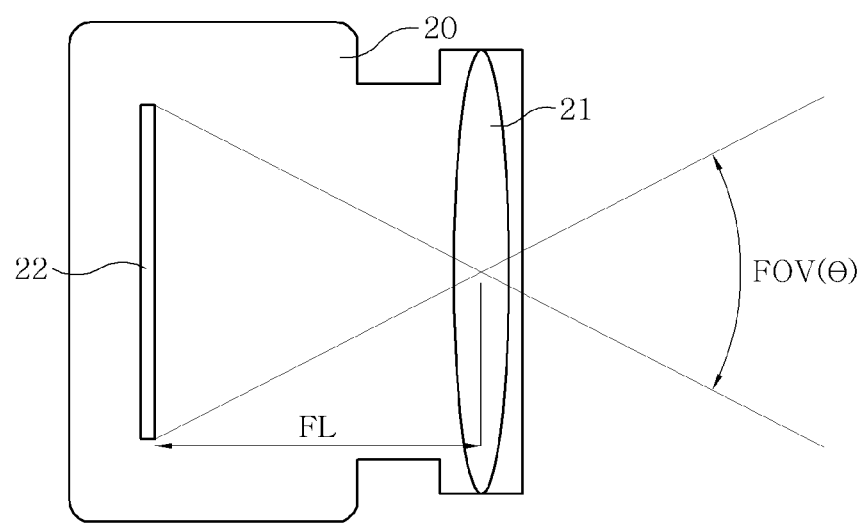
FIG. 2 is a view showing a camera model for explaining a camera FOV.
Figure 3:
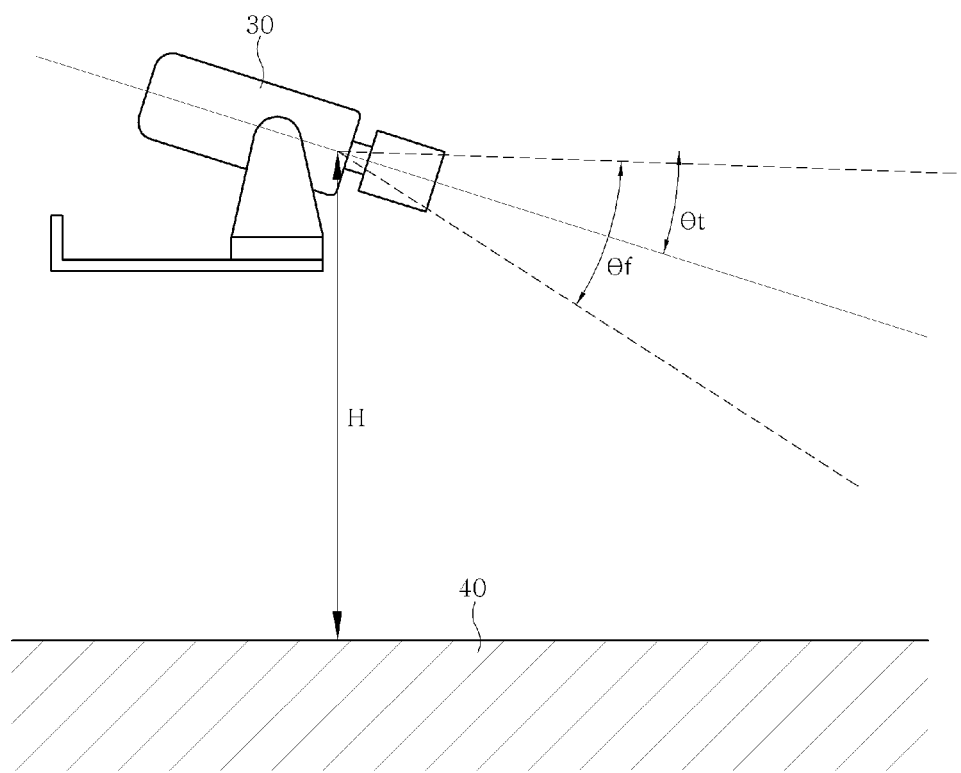
FIG. 3 is a conceptual view for explaining visual point parameters used to model a 3D space corresponding to an image.

FIG. 3 explains parameters required for a space modeling for mapping a 2D image to a 3D space, where a camera 30 is a visual point for acquiring an image as well as a visual point in a corresponding space modeling.

Accordingly, 2D mapping information on a space obtained through the camera 30 can be mathematically modeled through parameters such as height (H), tilt angle ($\theta t$) and field of view ($\theta f$) of the camera 30 with respect to the ground and vice versa, so if the parameters can be correctly known, it is possible to model a real 3D space from a 2D image and map the 2D image to the 3D space.

Here, the field of view (FOV) of the camera may be obtained using lens characteristics, focal length and so on and thus may be replaced with such lens characteristics or focal length.

Figure 4:
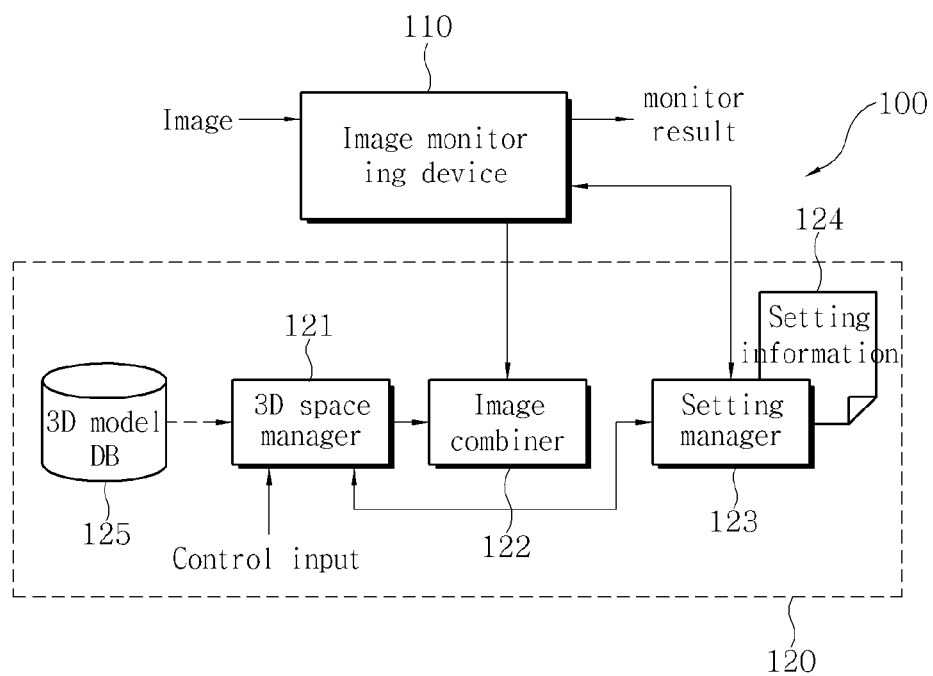
FIG. 4 is a view showing a configuration of an image security system including a camera calibration unit according to an embodiment of the present invention.

FIG. 4 shows a configuration of a camera calibration apparatus according to an embodiment of the present invention. This figure substantially shows a case where the camera calibration apparatus is applied to an image security system 100. An image monitoring device (including image analyzer) 110 shown may include an image analyzing means for image security. The image monitoring device 110 may manage images for a plurality of cameras, track or identify motion of objects in the images, analyze situations in the images, and provide obtained results to a separate image monitor responding means.

A correct image analysis by the image monitoring device 110 requires at least correct actual measurements for objects in the images. To this end, the image monitoring device 110 models a space for the images using parameters (camera height, tilt angle, FOV and so on) according to conditions of a camera connected thereto and maps the image to the modeled space.

Such parameters can be calculated using a relationship between images, which are obtained after disposing objects known in a photographing space at different positions, and real objects. However, this method is very troublesome and is difficult to cope with variations of monitoring device conditions of the cameras in real time. Alternatively, there is a method of actually measuring and acquiring values corresponding to such parameters. However, this method is also troublesome and is often difficult to acquire correct measurements. In addition, if the measurements are changed depending on variation of fixed positions, an auto-focusing function, a zooming function and so on, this method has to again make a parameter measurement. In addition, if a camera installation position is difficult to be accessed, this method is very difficult to make such measurement.

On the contrary, the embodiment of the present invention configured as shown allows the camera calibration unit 120 to determine parameters to be used in the image monitoring device 110 using only an image without making separate actual measurement.

The camera calibration unit 120 includes a 3D space manager 121 which represents one or more 3D objects of preset size in a 3D space created according to parameters related to a visual point and modifies the 3D space varied by varying the parameters under external control and the corresponding 3D objects, an image combiner 122 which combines and displays the 3D objects provided by the 3D space manager 121 and the image provided through the image monitor 110 in an overlay manner or the like, and a setting manager 123 which stores the parameters set in the 3D space manager 121 in association with a camera (channel) and its conditions of the image provided through the image monitor 110. Setting information 124 stored in the setting manager 123 can be used to calculate a space model for the image in the image monitoring device 110.

The camera calibration unit 120 may be configured in different ways such as being substantially configured on an image board such as the image monitoring device 110, or being provided as a portion of an image monitoring analysis program executed by a controller (for example, a computer) for controlling the image board, or being configured in a division manner.

The 3D space manager 121 can generate the 3D objects and display a reference plane of the 3D space as 2D grids in order to visually express the 3D space on which the 3D objects are expressed. The 3D objects may be indicated by different kinds of objects of known size, which can be moved, deleted or copied according to the external control or user's manipulation. Alternatively, a separate 3D object database 125 storing different kinds of objects is constructed and desired objects may be selected and displayed from the database. Here, if the 3D objects are expressed in the space together with their size information, the 3D objects are expressed to fit their size.

In expressing the 3D space, the 3D space manager 121 sets a visual point of the 3D space and can associate its parameters with a visual point of the image provided through the image monitoring device 110, that is, a visual point of the camera. Accordingly, the parameters may be the height, tilt angle and FOV of the camera as an image source, and in some cases, parameters such as lens characteristics, focal length, resolution and the like may be used instead of or along with FOV.

The external control signal provided to the 3D space manager 121 is a control signal generated according to user's manipulation. Since a computer is commonly used as a user interface of an image monitoring system including the image monitoring device 110 and accordingly the camera calibration unit 120 can be operated with the computer user interface, the parameters can be easily altered through an input device such as a keyboard, a joystick, a mouse or the like. Such altered parameters are directly applied to the 3D space and the 3D objects and are visually provided to the user through the image combiner 122, thereby allowing the user to modify the parameters of the 3D space manager 121 while confirming such a visual combined image.

The image monitoring device 110 commonly monitors images of a plurality of channels (cameras) although it may monitor an image provided through one channel. Therefore, it is preferable to associate parameter calibration setting values for a single image set by the image camera calibration unit 120 with the provided images. Accordingly, the setting manager 123 can associate channel information of an image source (for example, security camera) provided from the image monitoring device 110 with the parameters finally set through the 3D space manager 121 and store such association as the setting information 124.

In recent years, as cameras have provided a PTZ (Pan, Tilt and Zoom) function which can be remotely controlled by the image monitoring device 110, a setting value of even an image provided through the same camera (channel) has to be fixed. Accordingly, when the image monitoring device 110 provides camera state values related to position control of the camera, the setting manager 123 can store the channel information and the camera state information (for example, information of setting values fixed for a particular monitoring site, such as a PAN control value, a Tilt control value, a Zoom control value or a combination thereof) as the setting information 124 along with parameters provided through the 3D space manager 121.

In this manner, when the parameters according to the channel and camera conditions are stored as the setting information 124, the image monitoring device 110 can map the image to a real space through correct parameters even when a single camera is set for a plurality of monitoring objects or sites. On the other hand, if PTZ frequently occurs or calibration for new camera conditions is required, the setting manager 123 can predict and basically provide parameters for camera conditions to be newly calibrated based on camera condition information of a corresponding channel for facilitating detailed settings. In addition, if necessary, if not a calibration process, parameters for new camera conditions can be predicted and provided based on pre-stored setting information at a request of the image monitoring device 110.

Figure 5:
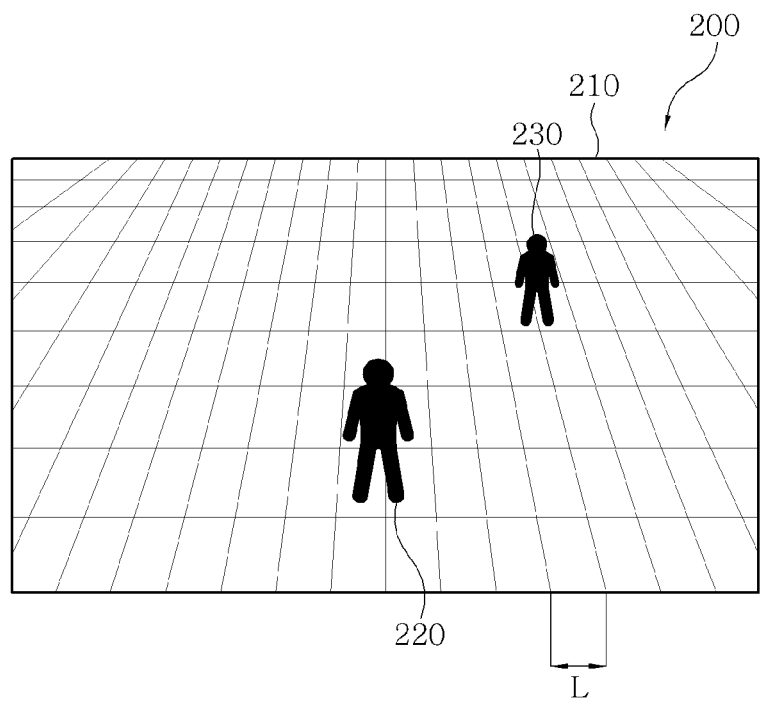
FIG. 5 is a view showing an example of representation of 3D space and 3D objects according to an embodiment of the present invention.

FIG. 5 shows an example of a representation of the 3D space and 3D objects provided by the 3D space manager according to an embodiment of the present invention. As shown, 2D grids 210 are displayed in a region corresponding to the ground of the 3D space 200, and a plurality of 3D objects 220 and 230 is displayed at different positions on the ground. The 3D objects are illustrated with example of a standard human body as a main monitoring target in an image. Instead of such a human body model, different kinds of vehicles, articles, or other viewed objects may be represented on the space according to their standard size.

The width (L) of the each grid 210 may be set to provide a square pattern of constant size for the sake of convenient manipulation and visual confirmation. In the shown example, the length of one scale of the grids is set as 1 m, but it may be set as different values, for example, 2 m, 4 m, etc., by default or alternatively by a user.

Figure 6:
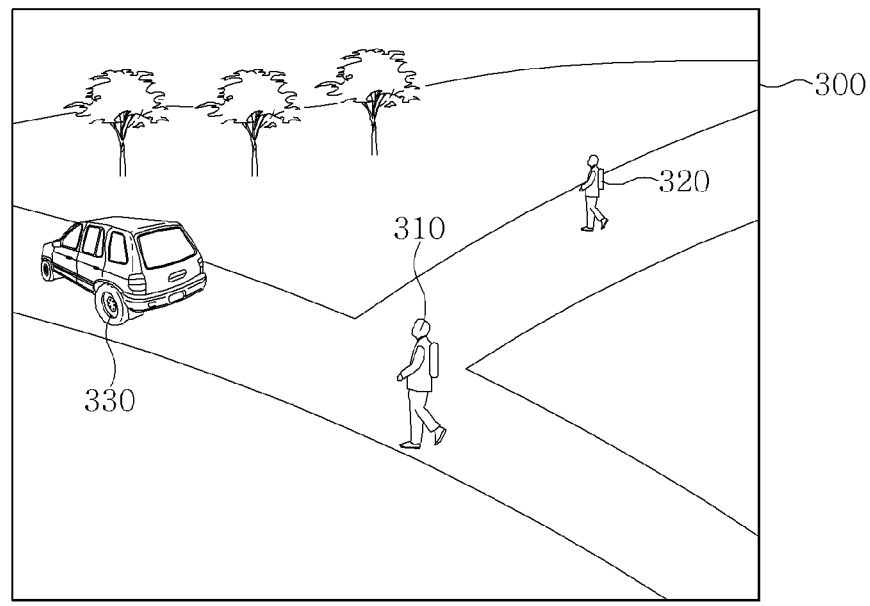
FIG. 6 is a view showing an example of a base image for explaining an embodiment of the present invention.

FIGS. 6 to 10 are provided for explaining an actual calibration process using the above-described camera calibration apparatus, FIG. 6 showing a provided image and FIGS. 7 to 10 showing parameter setting steps in the calibration process for the image. Of course, differently from the shown parameter setting steps, a user can manipulate any parameters at any point of time or manipulate a plurality of parameters simultaneously.

FIG. 6 shows a general image 300 where a vehicle 330 and a plurality of persons 310 and 320 are present. For effective calibration, the image combiner can perform calibration for the provided image which is in pause.

Figure 7:
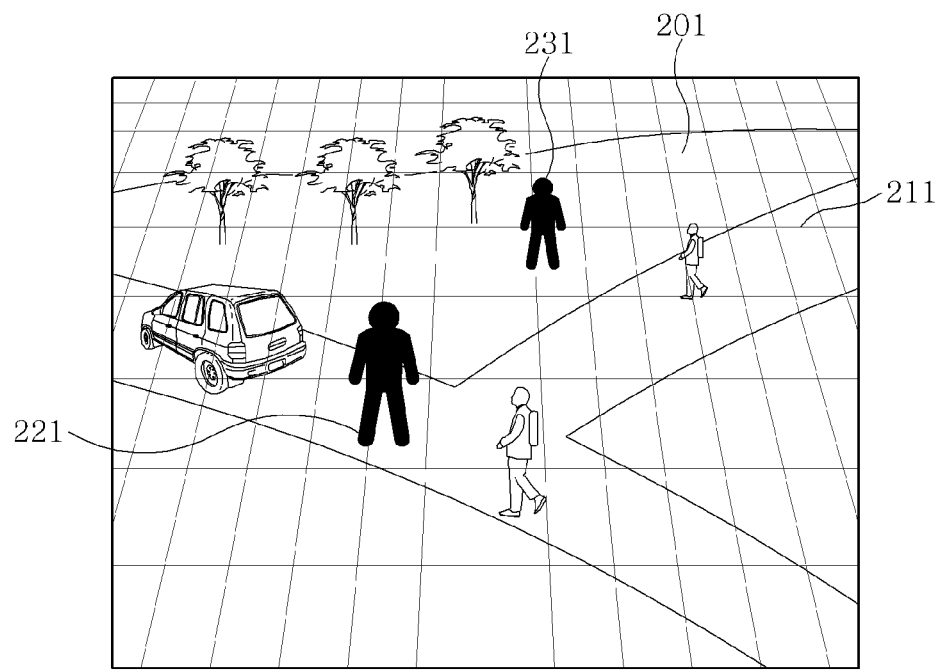
FIGS. 7 to 10 are views showing an example of a screen displaying a camera calibration process according to an embodiment of the present invention.

FIG. 7 is a screen provided to a user through the image combiner when the camera calibration unit operates the 3D space manager to generate a 3D space and 3D objects according to basic parameters.

As shown, grids 211 representing a base plane at a visual point independent of a real image and a pair of human body model objects 221 and 231 are displayed on the screen.

Figure 8:
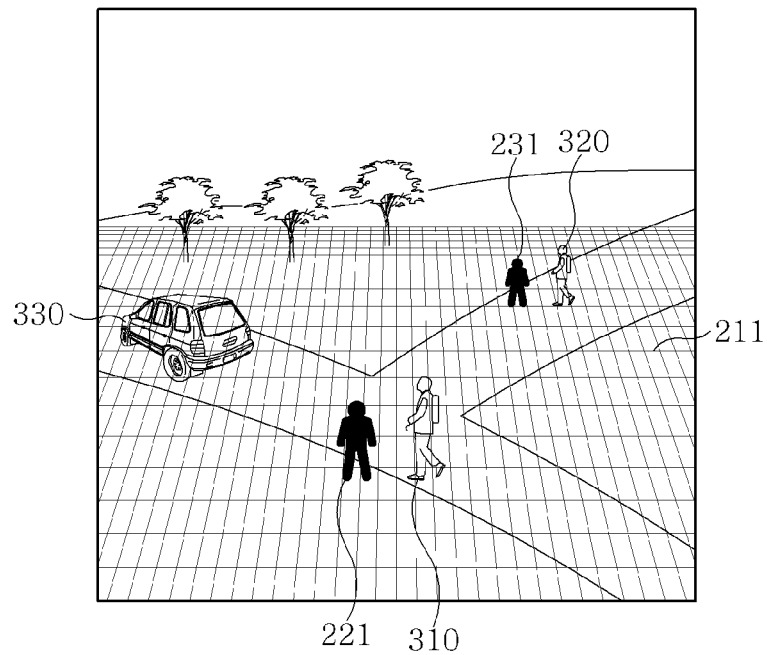

FIG. 8 shows a case where the 3D space manager is controlled to adjust a tilt angle at a visual point. That is, a visual point tilt angle is adjusted to coincide with a tilt angle of a camera in order to make a visual point in a generated 3D space equal to a visual point of the camera. This results from adjustment of a parameter corresponding to a tilt angle at a visual point such that the grids 211 corresponding to the base surface in the 3D space are visually matched to a surface of an image. This can obtain a tilt angle of a real camera.

However, there is a big difference between size of the grids in the shown image and a difference between the human model objects 221 and 231 and persons in a real image.

Figure 9:
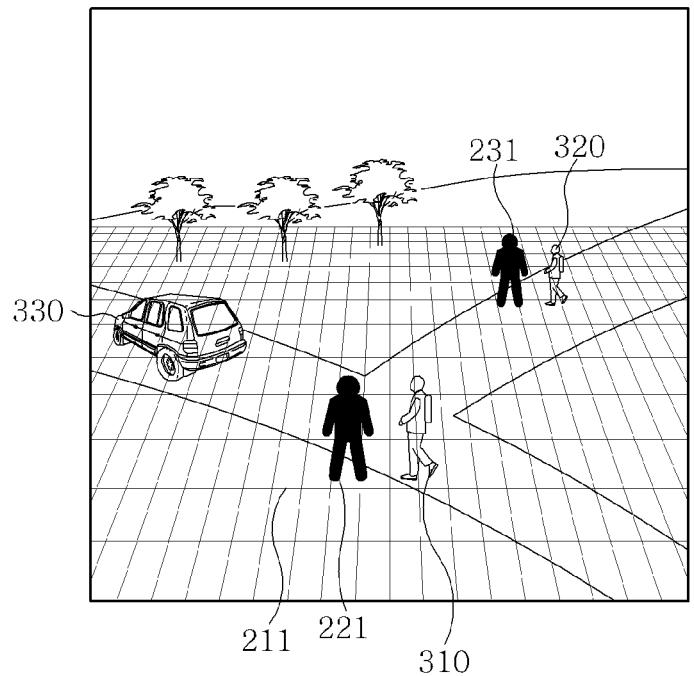

FIG. 9 shows the step where the grid size and one 221 of the human model objects are adjusted to be similar to a real image by adjusting the height of a visual point. That is, by adjusting the visual point height corresponding to the camera height, the size and arrangement of grids become similar to the real image, when the visual point height can be regarded as the camera height.

At this time, the human model objects 221 and 231 are moved to the vicinity of real persons 310 and 320 in the image so that they correspond to the real persons 310 and 320, and the size of one of the human body model objects 221 and 231 is adjusted to be approximately equal to one of the real persons 310 and 320.

However, although the size of one 221 of the human body model objects is approximately equal to the size of the corresponding real person 310, the size of the human body model object corresponding to the person 320 existing at a different position may be different from the size of the corresponding person 320.

Figure 10:
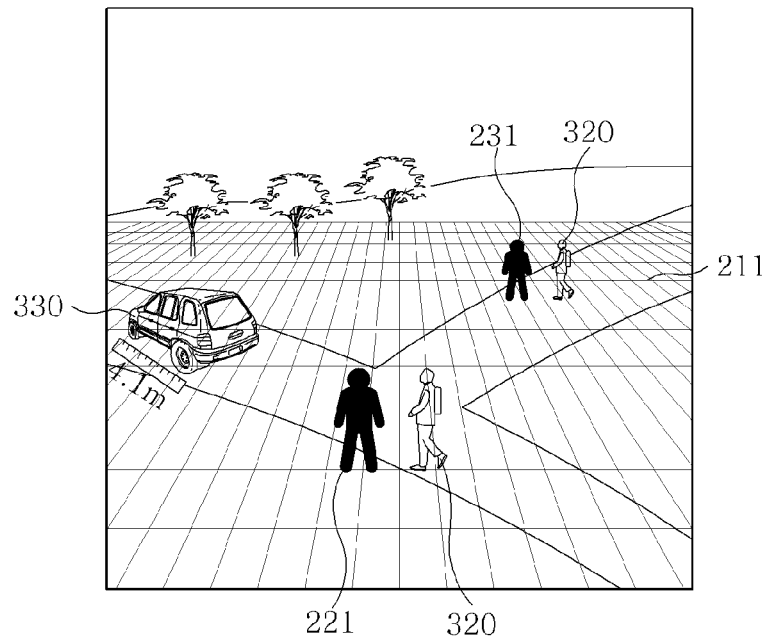

FIG. 10 shows the step where FOV is adjusted to control an offset between 3D objects represented in a 3D space. As shown, a corresponding parameter is manipulated to make the size of the human body model objects 221 and 231 match the size of the persons 310 and 320 in the image, respectively.

A virtual ruler may be further displayed to confirm such matching. The 3D space manager can receive a plurality of positions on the space selected according to a control input, that is, a user's manipulation and calculate and display information on a distance or height therebetween, their area and volume and so on. In the shown example, the length of the vehicle 330 is measured through the virtual ruler. If the length of a real vehicle is known, accuracy of such measurement can be more precisely confirmed through the virtual ruler.

Such a virtual ruler can be utilized as an additional function which may be provided according to a user selection independent of the parameter setting step or process.

Figure 11:
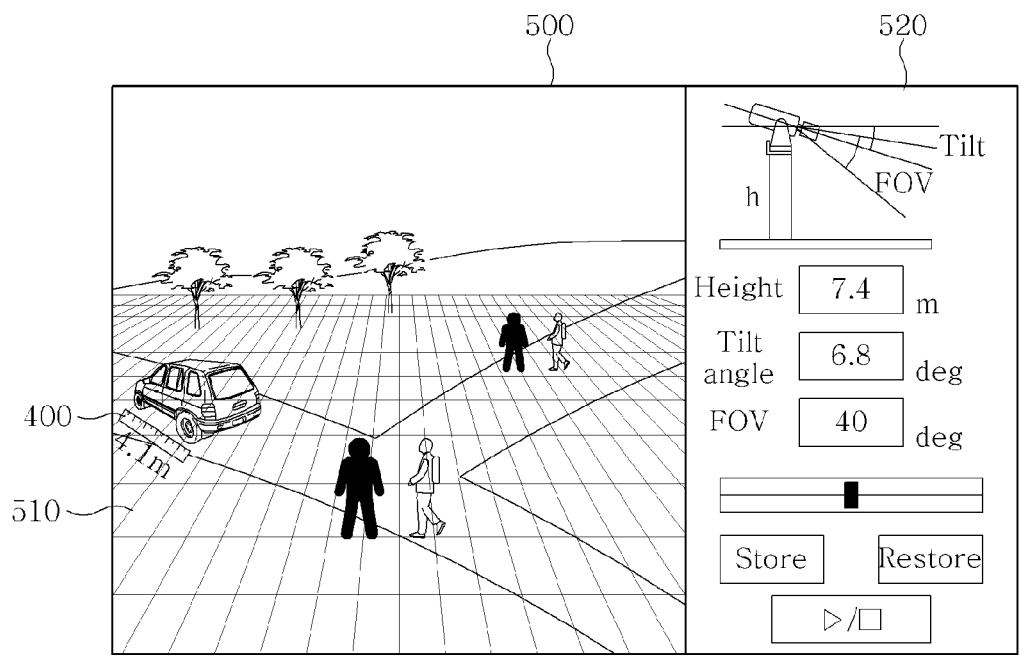
FIG. 11 is a view showing a user interface according to an embodiment of the present invention.

FIG. 11 shows an example of a user interface for the camera calibration unit. As shown, an image, a 3D space and objects are displayed on a portion 510 of a screen, and corresponding parameters can be confirmed through information displayed in the right side 520 of the screen. The parameters can be altered through a keyboard, a mouse or other input interfaces and may be adjusted in a manner of directly inputting the parameters in an input box showing parameter information or manipulating a slide.

Figure 12:
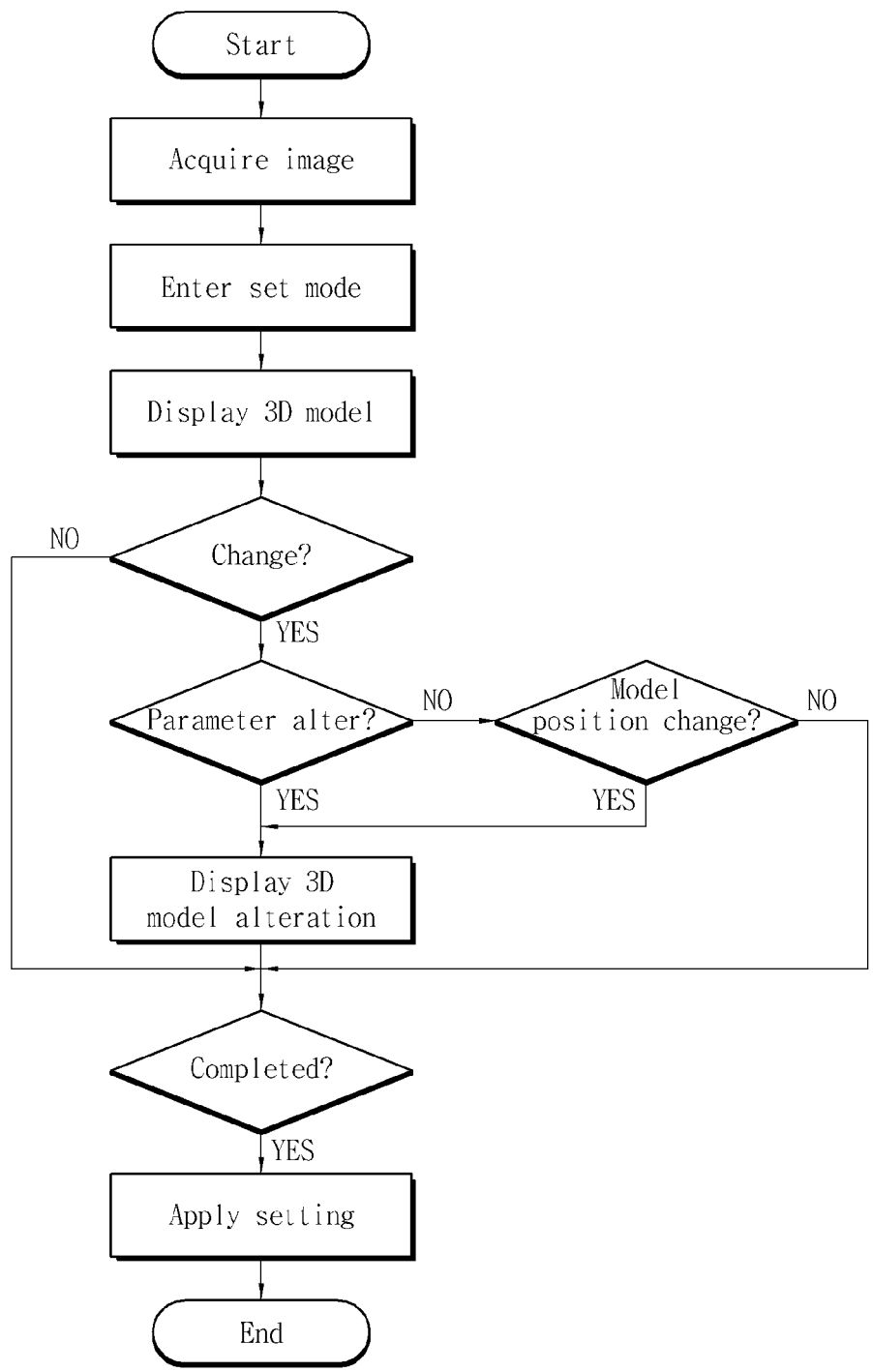
FIG. 12 is a flow chart of a camera calibration process according to an embodiment of the present invention.

FIG. 12 is a flow chart showing an operation process according to an embodiment of the present invention. As shown, an image is acquired from an external image source and the process enters a parameter setting mode through camera calibration.

The camera calibration unit generates a space model which represents one or more 3D objects on a 3D space, and then displays the space model on the acquired image in an overlay manner.

If parameters are required to be manipulated, parameters for the space model displayed in the image in the overlay manner are manipulated through any input interface, when the 3D space manager adjusts the 3D space and 3D objects of the space model. The adjusted space model may be immediately displayed on the image to allow a user to confirm the space model.

If the user wishes to make the 3D objects match objects in the image, positions of the 3D objects can be altered, when the 3D space manager again represents the 3D objects to fit the 3D space depending on the altered positions.

After completion of such parameter manipulation and alternation of the positions of the 3D objects, the set parameters are stored in association with the external image source of the acquired image and its conditions, and then setting information is generated.

While the present invention has been particularly shown and described with reference to exemplary embodiments thereof, it will be understood by those skilled in the art that various changes in form and details may be made therein without departing from the spirit and scope of the present invention. The exemplary embodiments are provided for the purpose of illustrating the invention, not in a limitative sense. Thus, it is intended that the present invention covers the modifications and variations of this invention provided they come within the scope of the appended claims and their equivalents.

What is claimed is:

1. A camera parameter calibration apparatus, comprising:
   a 3-dimensional (3D) space manager generating a 3D object in a 3D space using a plurality of parameters related to a visual point of the 3D space and a 3D object database, the plurality of parameters including those of height, tilt angle, field of view, lens characteristics, focal length and resolution of a camera, the 3D object being replaceable, addable or removable according to a control of a user via a user interface, and being displayable on a base surface of the 3D space using a 2D grid;

an image combiner combining the 3D object generated by the 3D space manager with a real image provided from an external image source, and displaying the combined 3D object and the real image, the plurality of parameters being manually alterable by the user of the apparatus via the user interface to match the generated 3D object to an object in the real image; and a setting manager storing any altered parameter and associating the altered parameter with the external image source.

2. The camera parameter calibration apparatus according to claim 1, wherein the 3D space manager generates a plurality of 3D objects including said 3D object, and displays said 3D object selected by the user.

3. The camera parameter calibration apparatus according to claim 1, wherein the 3D space manager displays at least one of distance, area and volume calculated from positions in the 3D space selected by the user.

4. The camera parameter calibration apparatus according to claim 1, wherein the setting manager receives state information of the external image source and stores the state information with the altered parameter.

5. The camera parameter calibration apparatus according to claim 4, wherein the setting manager estimates a parameter that is not stored, based on the altered parameter stored in association with the state information of the external image source.

6. A camera parameter calibration method, comprising:

a model generating step of generating a space model representing one or more 3-dimensional (3D) objects in a 3D space;

a parameter adjusting step of overlaying and displaying the 3D objects generated in the model generating step on a real image provided from an external image source, and manually adjusting a visual point parameter of the space model by a user of the apparatus via a user interface to match one of the generated 3D objects to an object in the real image;

a step of reconfiguring the space model by changing the visual point parameter including at least one of height, tilt angle, field of view, lens characteristics and focal length for a visual point of the space model according to a control of the user, and overlaying and displaying the reconfigured space model on the image; and a setting step of storing the parameter adjusted in the parameter adjusting step as a camera parameter for the external image source.

7. The camera parameter calibration method according to claim 6, further comprising a step of moving and displaying one of the 3D objects of the space model in the 3D space according to the control of the user, or adding, replacing or deleting the one of the 3D objects.

8. The camera parameter calibration method according to claim 6, wherein the parameter adjusting step further includes a step of, when positions in the 3D space of the space model are selected according to the control of the user, providing at least one of distance, area, height and volume calculated using the selected positions.

* * * * *